No. 866,347. PATENTED SEPT. 17, 1907.
J. T. FAGAN.
MACHINE FOR FLANGING GLASS TUBES.
APPLICATION FILED MAR. 27, 1905.
5 SHEETS—SHEET 3.
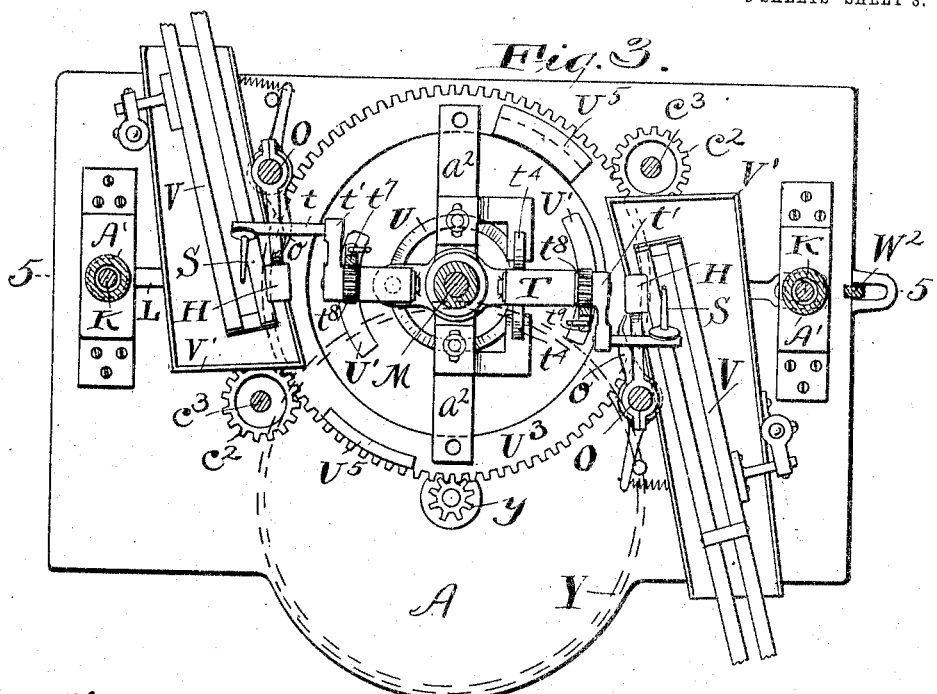
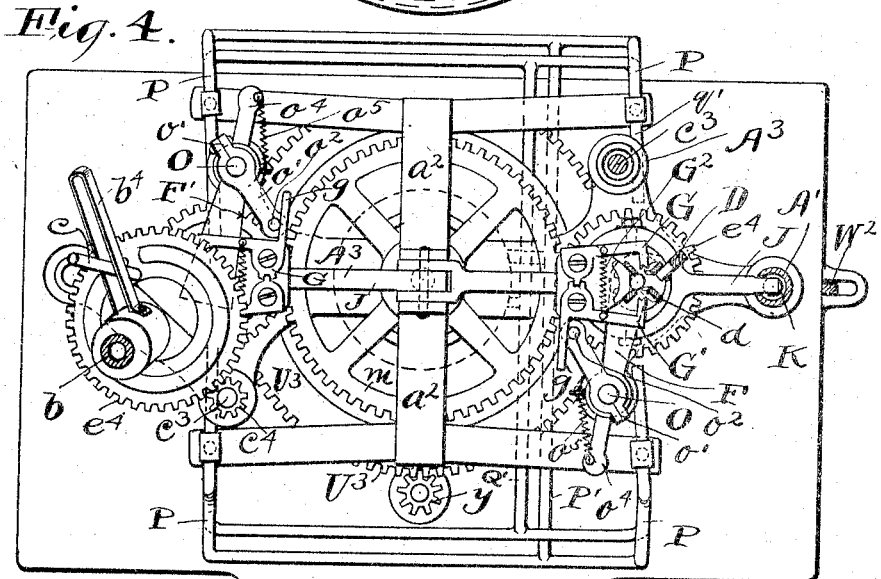
Witnesses.
E. B. Gilchrist
J. S. Kohn
Inventor.
John T. Fagan,
By his Attorneys,
Thurston & Bates

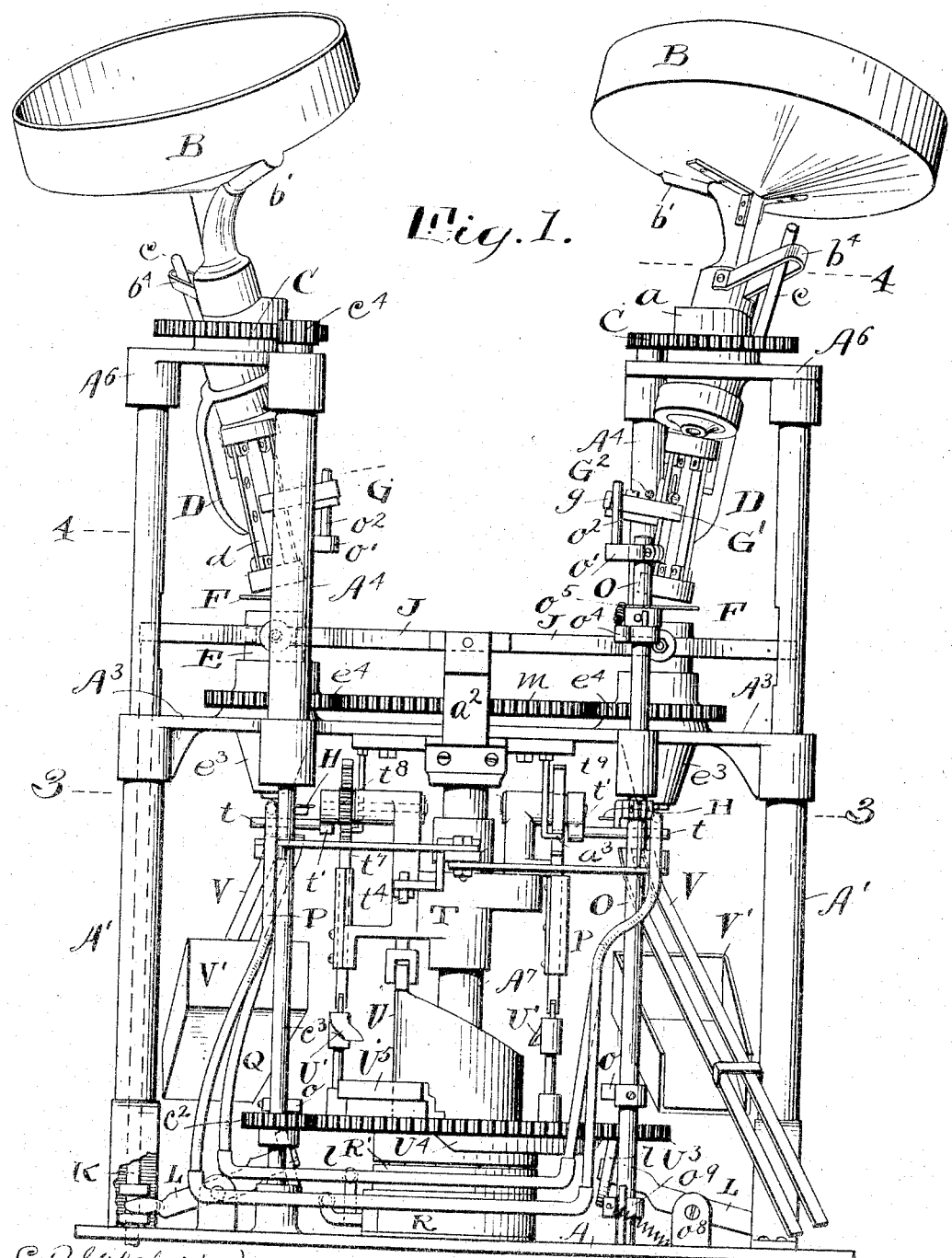

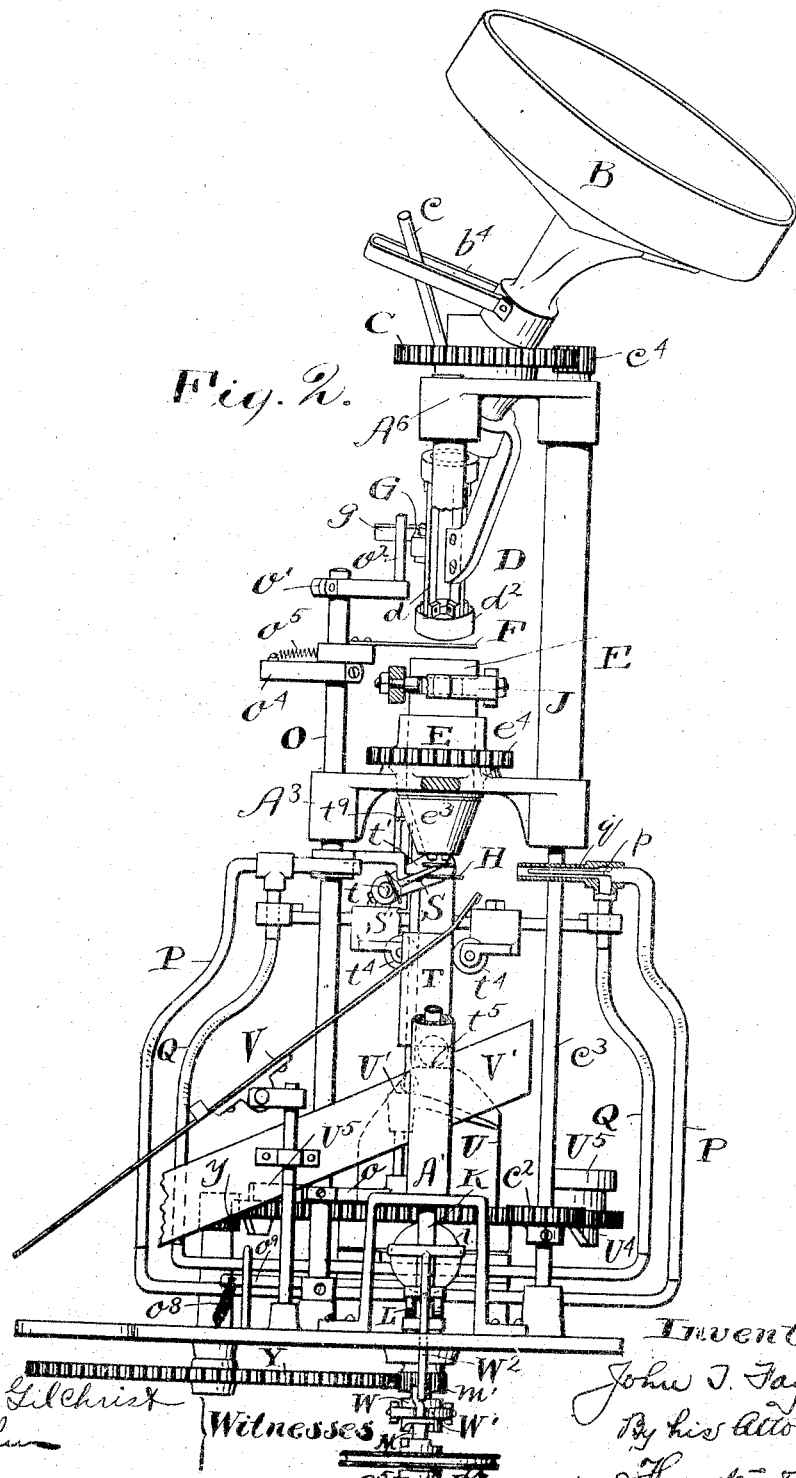

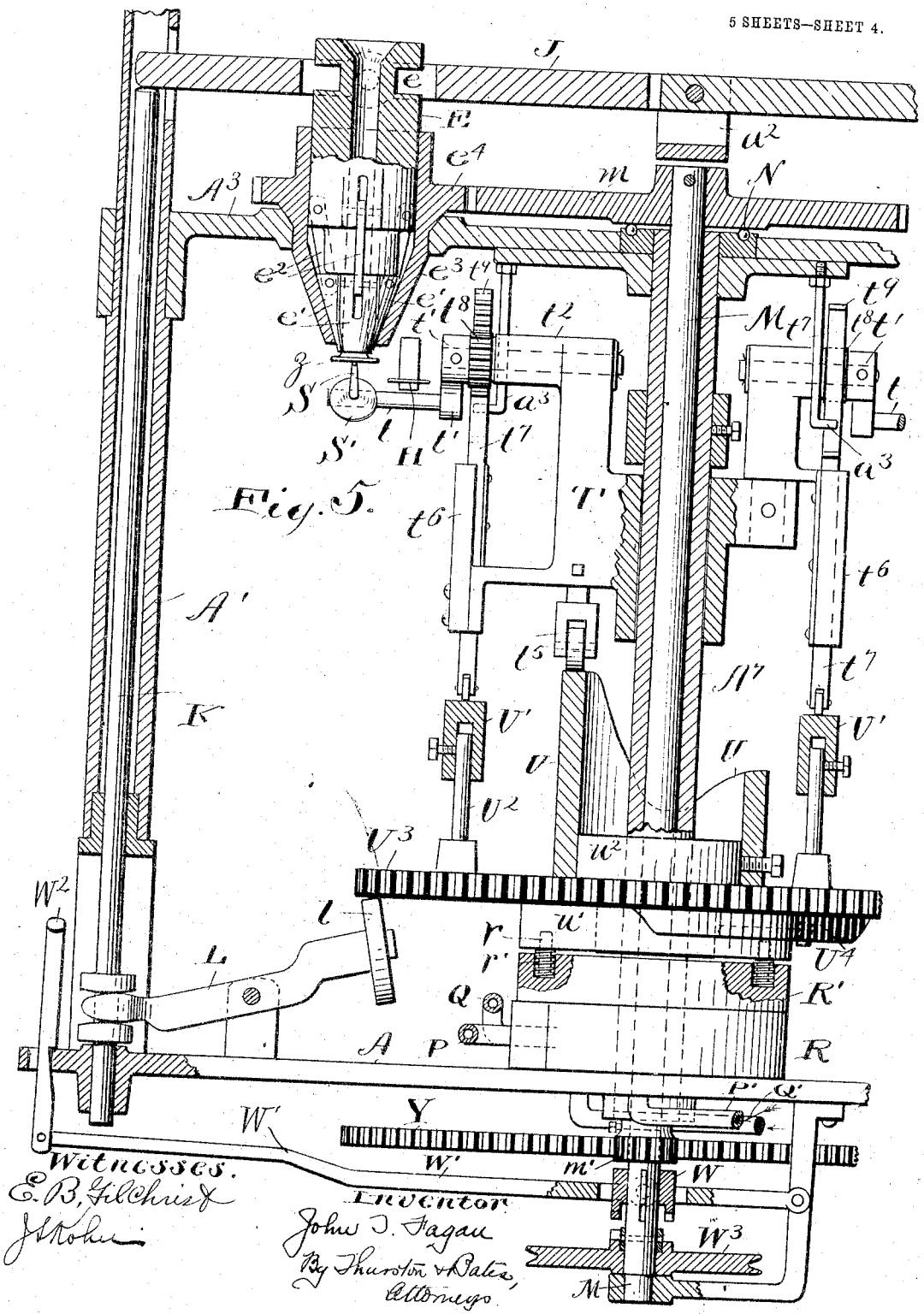

No. 866,347. PATENTED SEPT. 17, 1907.
J. T. FAGAN.
MACHINE FOR FLANGING GLASS TUBES.
APPLICATION FILED MAR. 27, 1905.
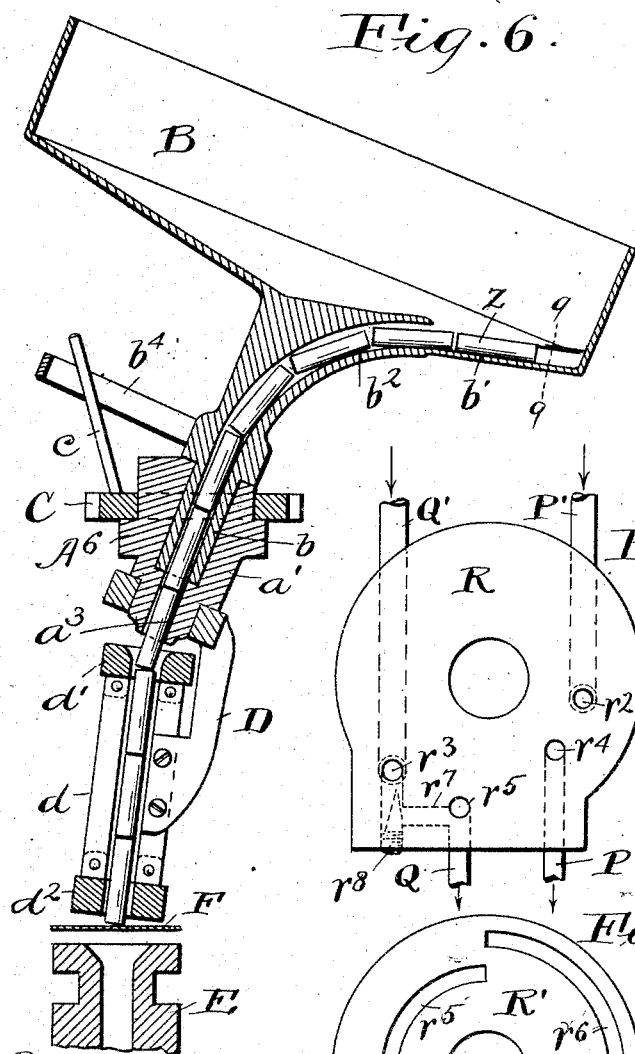

UNITED STATES PATENT OFFICE.

JOHN T. FAGAN, OF CLEVELAND, OHIO, ASSIGNOR TO THE NATIONAL ELECTRIC LAMP COMPANY, OF CLEVELAND, OHIO, A CORPORATION OF NEW JERSEY.

MACHINE FOR FLANGING GLASS TUBES.

No. 866,347.   Specification of Letters Patent.   Patented Sept. 17, 1907.

Application filed March 27, 1905. Serial No. 252,112.

*To all whom it may concern:*

Be it known that I, JOHN T. FAGAN, a citizen of the United States, residing at Cleveland, in the county of Cuyahoga and State of Ohio, have invented a certain new and useful Improvement in Machines for Flanging Glass Tubes, of which the following is a full, clear, and exact description, reference being had to the accompanying drawings.

The object of this invention is to provide an efficient automatic machine for forming flanges on glass tubes. Such flanged tubes are particularly utilizable in the manufacture of incandescent lamps, constituting as they do the member which carries the filament.

The present machine has a hopper into which are put short sections of tubing, and these are automatically fed to the flanging mechanism then flanged and then discharged into a suitable receptacle. Any broken glass is separately discharged during the operation. The flange is formed perfectly, irrespective of variations in the length or diameter of the tube. The means for the accomplishment of these objects are included within this invention, which is hereinafter more fully explained and the essential elements of which are set out in the claims.
The machine shown in the drawings is made duplex having two hoppers and two flanging mechanisms operated from a single power shaft.

Figure 1 is a front elevation of the machine, and Fig. 2 a side elevation. Figs. 3 and 4 are horizontal sections on the correspondingly numbered lines of Fig. 1. Fig. 5 is an enlarged vertical section being on the line 5—5 of Fig. 3. Fig. 6 is an enlarged vertical section through the hopper. Fig. 7 is a top plan of the lower member of the gas and air valve; Fig. 8 is a bottom plan of the upper member of such valve. Fig. 9 is a detail in section on the line 9—9 of Fig. 6. Fig. 10 is a perspective view of a flanged tube showing the product of the machine.

Mounted on the bed plate A are a pair of tubular standards A'. These standards carry a cross frame-plate $A^3$ and rising from this frame-plate are additional tubular standards $A^4$. At the upper end of each standard A' and the adjacent standard $A^4$ is a connecting frame member $A^6$. This construction constitutes the frame of the machine. The bed plate A is suitably supported by means not shown, to allow the operation of gears and other parts beneath it.

Rigid with each of the plates $A^6$ is a boss $a$, which has an inclined socket opening $a'$ (Fig. 6) to receive the lower end of the tubular stem $b$ of the hopper B. This hopper B is formed, as shown in Fig. 6, and comprises a cylindrical wall and a slightly conical base. At one point in this base is a channel-like depression or groove $b'$, which leads into a tubular opening $b^2$ which curves through the stem of the hopper and terminates at the lower end thereof in alinement with an opening $a^3$ in the boss $a$.

Loosely journaled on the boss $a$ is a gear C which carries a pin $c$ taking into a stirrup $b^4$ on the stem of the hopper. As the gear revolves, the hopper is revolved, the loose play of the pin in the stirrup allowing for the different axes of revolution. When the channel $b'$ is at its lowermost position, as shown in Fig. 6, some of the tubes which are contained in the hopper settle into the channel, as shown at Z in Figs. 6 and 9. Then as the hopper revolves, these tubes become elevated so that they slide by gravity down through the curved opening $b^2$ and out of the lower end of the hopper. This makes a most convenient and satisfactory gravity feed. A quantity of the tubes are simply dumped into the hopper and the revolution of the same arranges them and they discharge themselves one at a time.

Secured to the lower end of the boss $a$ is a bracket D which carries a lantern-like structure consisting of several uprights $d$ and rings $d'$ and $d^2$ at the upper and lower ends thereof. This lantern furnishes means for guiding the tube in its further descent and allows broken pieces of glass to fall out through the spaces between the upright bars. This is another feature of the present invention. The lantern is inclined somewhat, but less than the hopper and furnishes an intermediate guide to direct the tubes into the vertical chuck E beneath the lantern.

Between the lantern and chuck is a stop plate F, which, when in the position shown, stops the tubes, preventing their entrance into the chuck. At the proper time this stop plate is swung away to allow the descent of the lowermost tube, as hereinafter explained. Just preceding the removal of the stop plate, a pair of pincers, consisting of the pivoted arms G and G', (Figs. 1 and 4), are released, and a spring $G^2$ connecting the same draw them toward each other, so that inturned toes on the ends thereof pass between the bars $d$ of the lanterns and grasp the next to the bottom tube, preventing more than one tube descending when the plate F is removed. By this means the tubes are fed one at a time into the chuck E. This is another feature of the invention. The mechanism for operating the pincers and swinging the plate F to idle position will be hereinafter explained.

When the tube drops into the open chuck E it is stopped by its lower end striking and resting upon a plate H, (Figs. 1, 2, and 5). At the time the tube drops into the chuck the same is held open by a shipper lever J, which is pivoted to a central frame bracket $a^2$ and which has pins taking into an annular groove $e$ in the chuck, and whose outer end extends through a slot into the tubular standard A' and rests on the upper end of a rod K loosely mounted within that standard.

Near its lower end this rod is engaged by the lever L which carries a roller $l$ whose upper portion is adapted to be engaged by a cam $U^4$. The cam is in engagement, and thus holds the chuck open at the time the tube drops into the chuck. Thereafter when the tube is resting on the bolt H the cam releases the lever L and the chuck descends by gravity and the jaws $e'$ of the chuck, which are held by links $e^2$ to the rest of the chuck, are forced inward by reason of the inwardly tapered sleeve $e^3$ which the jaws occupy. The jaws thus grasp the tube.

The sleeve $e^3$ of the chuck is journaled in the frame plate $A^3$ and carries a gear $e^4$ meshing with a continuously revolving gear $m$ on the upper end of the main shaft M. As the chuck closes, therefore, the tube begins to revolve. At the same time the plate H is automatically swung out of the way by means hereinafter explained.

Pointing directly towards the projecting end of the tube, which is grasped and revolved by the chuck, is an air nozzle $p$ surrounded by a gas nozzle $q$, (Fig. 2). These nozzles are connected by an air pipe P and a gas pipe Q with an automatic valve comprising the stationary ring R and the revolving ring R' resting thereon. These members have coöperating passageways, as hereinafter explained, which operate to open the air and gas pipes as soon as the tube has been grasped by the chuck. Some gas is always flowing through the pipe to maintain ignition at the nozzle, wherefore, when the main quantity of gas and air is turned on, a hot flame is projected against the revolving tube, soon heating it to the proper degree.

Now the flanging operation takes place. This is caused by means of a projecting pin S, (Figs. 2 and 5), which is carried on a stud $t$ mounted on an arm $t'$ which is secured on the rock shaft $t^2$ journaled in a cross head T. This cross head is slidable upon the stationary tube $A^7$, which is connected with the bed plate A and the frame plate $A^3$, and surrounds the main driving shaft M. The cross head T is prevented from rotating by reason of a pair of rollers $t^4$ bearing on opposite sides thereof. The cross head is raised and lowered by means of a crown cam U, which is clamped to a hub $u^2$ of the gear $V^3$ which is loosely journaled on the tube $A^7$. The cross head T carries a guide arm $t^6$ in which slides a rack $t^7$, whose teeth mesh with the teeth of a pinion $t^8$ on the rock shaft $t^2$. The lower end of this rack carries a roller adapted to ride upon a shoe U' adjustably mounted on a stud $U^2$ rising from the upper side of the gear $U^3$. By this means the cross head is elevated and the rock shaft $t^2$ is held against rotation with the flanging pin S projecting diagonally, as shown in Fig. 2. The flanging pin coming in this position into engagement with the lower edge of the rapidly revolving heated tube forms a flange thereon, as shown at $z$ in Figs. 5 and 10. During this flanging operation a straight face of the cam U holds the pin S stationary. Inasmuch as the tube is stopped at its forward end in its descent onto the chuck, it always projects the same amount from the chuck irrespective of the length of the tube, and the flange is thus always formed of the proper size, notwithstanding variations in the lengths of the tubes. This is an important feature, for it is impracticable to cut off the tubes of exactly the same length. Immediately following the formation of the flange the shoes U', by reason of the revolution of the gear $U^3$, are moved out from under the racks $t^7$, which descending by gravity rotate the rock shaft $t^2$. This rotation brings the flanging pin into a vertical position directly beneath the flanged tube, and at the same time the cam $U^4$ on the lower side of the gear $U^3$ engaging the roller $l$ operates the shipper arm J to open the chuck, whereupon the flanged tube drops around the flanging pin onto the collar S' at the base thereof. As soon as the complete tube has dropped onto the flanging pin, as stated, a second face of the cam U comes beneath the roller $t^5$ and the cross head descends, thus lowering the tube on the flanging pin. Just after the tube has cleared the chuck a lug $t^9$ at the upper end of the rack $t^7$ engages the stationary bracket $a^3$, stopping the movement of the rack, whereupon the continued descent of the cross head rotates the pinion $t^8$ through substantially half a revolution, which turns the pin S up side down, allowing the flanged tube to drop off of the same. When the flanged tube drops, it passes onto the runway V, consisting of a pair of parallel downwardly inclined bars. The flange of the tube rests on these bars, the shank extending between them. The upper portion of this run way stands over a waste box V'. If, for any reason, the flange has not been formed on the tube it drops through the run way into the waste box. If the flange has been formed, the tube slides down the run way beyond the end thereof into a suitable receiving box not shown.

I will now describe the driving mechanism and its connection with the hopper, the pincers and the stop plates. The main shaft M is journaled within the tube $A^7$ carried by the frame plates A and $A^3$. The thrust on this shaft is downward, due to the weight of the parts, and this is taken by a ball bearing N, (Fig. 5) between the gear $m$ and the frame plate $A^3$. Splined on this shaft beneath the bed plate is a clutch collar W, which is operated by a suitable shipper lever W' held by a catch $W^2$. The clutch W is adapted to mesh with clutch teeth formed on the hub of the main driving pulley $W^3$. This pulley is continuously revolved and a simple release of the catch thus throws the machine into operation. It is shown in Fig. 5 as in idle position.

Rigid on the shaft M is a pinion $m'$, which meshes with a gear Y. On the shaft of this gear Y is a pinion $y$, which meshes with the gear $U^3$ heretofore described. Meshing with this gear $U^3$ are a pair of pinions $c^2$ on shafts $c^3$, which carry at their upper ends pinions $c^4$ meshing with the gears C which rotate the hoppers. The chucks, as stated, are revolved by reason of their gears meshing with the gear $m$, on the upper end of the main shaft. These chucks thus revolve much more rapidly than do the cams carried by the gear $U^3$, while the hoppers revolve with still less rapidity.

Extending vertically in the machine are a pair of rock shafts O. These shafts carry tappet arms $o$, each adapted to be engaged by the corresponding cam $U^5$ carried by the gear $U^3$. Such engagement rocks the shaft. This movement swings the rock arm $o'$, (Figs. 1, 2, and 4). This arm has a pin $o^2$ engaging a tail $g$ on the arm G' of the pincers, and normally holding them idle. Its movement releases such tail, allowing the pincers to swing together, by reason of the spring $G^2$, and grasp the tube next above the one resting on the stop plate F. The further rocking of the shaft O removes this stop plate F from beneath the tube resting thereon, allowing it to drop into the chuck.

The stop plate F is not rigid on the shaft O, but rests on a collar $o^4$ thereon by which it is driven through the intervention of a pair of pins carried by the collar and stop plate and adapted to engage. A spring $o^5$ tends to maintain such engagement. This arrangement is so that when the stop plate swings back if a tube should have accidentally descended from the lantern it will not be broken. The stop plate H is also carried by the rock shaft O. It swings beneath the chuck to receive the tube just as the stop plate F is swinging out of the way to release it. After the chuck has grasped the tube the stop plate H swings out of the way and the stop plate F comes back into position.

The gas and air valve consists, as heretofore stated, of the stationary ring R and the revolving ring R'. Each of these rings surrounds the stationary tube $A^7$, but the ring R' is compelled to revolve by reason of pins $r$ carried by the boss $u'$ on the under side of the gear $U^3$ which project into recesses in the ring R'. Springs $r'$ surrounding these pins maintain a snug engagement between the rings R and R'. The main air and gas pipes P' and Q' communicate respectively with openings $r^2$ and $r^3$, (Fig. 7), in the upper surface of the ring R. These openings are at different radial distances from the center of the ring. Adjacent openings $r^4$ and $r^5$ in the same circumferential lines respectively, as the openings $r^2$ and $r^3$ communicate with the air and gas delivery pipes P and Q leading to the two burners. On the under side of the disk R' are a pair of partly circumferential grooves $r^5$ and $r^6$. When this ring is in such a position that these grooves bridge the openings between the main pipes and the delivery pipes the same are connected and the gas or air flows as desired.

As shown, the inner groove $r^5$ governs the air. This is entirely on when the tube is projecting from the chuck and at other times is entirely shut off. The gas is controlled by the outer groove $r^6$. The gas is entirely on when the tube projects from the chuck, but at other times only enough gas is on to maintain the burner lighted. This is provided by means of a by-pass $r^7$ which is in constant communication with the delivery pipe Q, being controlled by the chucking plug $r^8$.

I claim:

1. In a machine for flanging glass tubes, the combination of means for forming the flange, a rotatable hopper, and a suitable guide for the tube between the hopper and the flange forming mechanism.

2. In a machine for flanging glass tubes, the combination of means for forming the flange, and a rotatable hopper set on an axis out of the vertical, whereby the tubes are fed by gravity.

3. The combination with a suitable support, of a hopper having a stem journaled into said support at an angle to the vertical, a tubular passageway leading from the base of the hopper through said stem, whereby articles placed in the hopper may settle into the entrance to said passageway, in one position of the hopper, and in another position will be raised to cause them to slide down said passageway.

4. The combination of a rotatable hopper journaled on an axis oblique to the vertical, a depression in the base of said hopper, and a passageway leading therefrom through the stem of the hopper.

5. The combination, with a suitable support, of a hopper having a stem journaled in said support on an axis at an angle with the vertical, a gear rotatably carried by said support, and a slidable connection between the gear and the hopper whereby the hopper may be rotated.

6. In a machine for flanging glass tubes, the combination of a hopper adapted to feed tubes, mechanism for rotating the fed tubes, a passageway between the hopper and said mechanism to allow the discarding of broken glass.

7. In a machine for flanging glass tubes, the combination of a hopper, a passageway therefrom, and mechanism adapted to enter the passageway for grasping a tube therein.

8. In a machine for flanging glass tubes, the combination of a rotatable chuck, means for guiding the tubes thereto, a stop adapted to intercept the tubes, and means for moving said stop to or from an idle position.

9. In a machine for flanging glass tubes, the combination of a hopper, a chuck, a lantern-like guide between the hopper and chuck, a pair of pincers having jaws adapted to enter between the bars of such guide to grasp a tube, and means for operating said pincers to release the tube.

10. In a machine for flanging glass tubes, the combination of a chuck, an open guide thereto, a pair of pincers having jaws adapted to enter the guide to grasp a tube, means for operating said pincers to release the tube, a stop adapted to stand beneath such guide, and means for moving said stop out of the path of the tube at the time when the pincers grasp their tube.

11. In a machine for flanging glass tubes, the combination of a rotatable chuck into which the tube may be fed, a stop for the tube adapted to stand in front of said chuck and limit the projection of the tube therefrom.

12. In a machine for flanging glass tubes, the combination of a rotatable chuck into which the tube may be fed, a stop for the tube adapted to stand in front of said chuck and limit the projection of the tube therefrom, means for heating the forward end of said tube, and a member for engaging said tube to form a flange thereon.

13. In a machine for flanging glass tubes, the combination of a rotatable chuck into which the tube may be fed, a stop for the tube adapted to stand in front of said chuck and limit the projection of the tube therefrom, mechanism suitably timed for closing the chuck, for then moving the stop away from the tube, and for then forming a flange on the projecting end of the tube.

14. In a machine for flanging glass tubes, the combination of a vertical chuck, means for feeding a tube into the upper end thereof, and a stop adapted to stand below the chuck and stop the tube.

15. In a machine for flanging glass tubes, the combination of a vertical chuck, a hopper above the same, a passageway between the hopper and chuck whereby tubes may be fed by gravity into the chuck, and a stop adapted to stand below the chuck and stop the tube.

16. In a machine for flanging glass tubes, the combination of a vertical chuck, a downward passageway to the upper end thereof, whereby tubes may be fed by gravity into the chuck, a stop adapted to stand below the chuck and stop the tube, means for swinging said stop out of the way, means for rotating said chuck, a flanging member and means for bringing the flange member into engagement with the tube.

17. In a machine for flanging glass tubes, the combination of a rotatable chuck adapted to carry a tube projecting from its lower end, means for heating such projecting end, a flanging pin, means for causing it to engage such lower end to form a flange, means for loosening the chuck to allow the flanged tube to drop out of the chuck.

18. In a machine for flanging glass tubes, the combination of a rotatable chuck adapted to carry a tube projecting from its lower end, means for heating such projecting end, a flanging pin, means for causing it to engage such lower end to form a flange, means for allowing the flanged tube to pass out of the chuck onto said pin, and means for then inverting said pin to allow the flanged tube to pass off of the same.

19. In a machine for flanging glass tubes, the combination of a rotatable chuck adapted to carry a tube projecting from its lower end, means for heating such projecting end, means for forming a flange therein, means for allowing the flanged tube to pass out of the chuck, and an inclined track adapted to receive the tube.

20. In a machine for flanging glass tubes, the combination of a rotatable chuck adapted to carry a tube projecting from its lower end, means for heating such projecting end, means for forming a flange thereon, means for inverting said flanged tube, and a pair of inclined rails adapted to receive the flange of the tube with the body of the tube depending between them.

21. The combination of a rotatable chuck adapted to carry a tube projecting from its lower end, means for heating such projecting end, a flanging pin, means for causing the same to engage, in an inclined position, the lower end of the tube to form a flange, means for swinging the pin into a vertical position beneath the tube, means for then releasing the chuck, means for then lowering the pin to lower the tube, and means for then inverting the pin to discharge the tube.

22. The combination of a rotatable chuck, a sliding cross head, a rock shaft and a pinion rotatably carried on said cross head, a cam for raising or lowering the cross head, and a rack for operating said pinion, and mechanism for operating said rack independently of the operation of the cross head, and a flanging pin carried by the rock shaft.

23. In a machine for flanging glass tubes, the combination of a rotatable chuck, means for feeding the tubes successively thereinto and for closing the chuck, means for forming a flange on the tube, a burner fed by gas and air, and automatic means for controlling the same to force a hot flame against the projecting end of said tube in the chuck, and to turn down said flame when the tube is out of the chuck.

24. The combination with a heating burner, of a chuck adapted to grasp the tube, a member for forming a flange thereon, a rotatable shaft geared to the chuck, a cam operated by said shaft to move said flanging member toward or from the chuck, and a rotatable gas and air valve operated by said shaft for governing the supply to the heating burner.

25. The combination of a central vertical shaft, means for rotating the same, a pair of chucks rotatably mounted on opposite sides of the shaft, gearing connecting said chucks with the shaft, a pair of hoppers, a connection between each hopper and the corresponding chuck, a slidable cross head, and a pair of flanging pins carried thereby and adapted to engage the projecting ends of the tubes in said chucks.

26. The combination of a driving shaft, a pair of chucks rotatably mounted, gearing connecting said chucks with the shaft, a slidable cross head, a pair of flanging pins carried thereby and adapted to engage the projecting ends of the tubes in said chucks, and rotatable cams journaled about said shaft and operated by it, said cams controlling the position of the cross head, the position of the flanging pins, and the engagement of the chuck.

27. A machine for flanging glass tubes comprising means for securing the tubes in position to be flanged, means for feeding the tubes into said securing means, means for heating the tubes, means for flanging the tubes, and means for relatively rotating the tubes and said flanging means.

28. A machine for flanging glass tubes comprising means for securing the tubes in position to be flanged, automatic means for feeding the tubes into said securing means, means for heating the tubes, means for flanging the tubes, and means for relatively rotating the tubes and said flanging means.

29. A machine for flanging glass tubes comprising means having a fixed axis, for securing the tubes in position to be flanged, means for heating the tubes, means for flanging the tubes, and means for relatively rotating the tubes and said flanging means.

30. A machine for flanging glass tubes comprising means for securing the tubes in position to be flanged, means for feeding the tubes into said securing means, means for heating the tubes, means for flanging the tubes, means for relatively rotating the tubes and said flanging means, and common means for operating said feeding and flanging means.

31. A machine for flanging glass tubes comprising means for securing the tubes in position to be flanged, means for feeding the tubes axially into said securing means, means for heating the tubes, means for flanging the tubes, and means for relatively rotating the tubes and said flanging means.

32. A machine for flanging glass tubes comprising means for securing the tubes in position to be flanged, means for automatically securing the tubes in said securing means, means for heating the tubes, means for flanging the tubes, and means for relatively rotating the tubes and said flanging means.

33. A machine for flanging glass tubes comprising means for securing the tubes in position to be flanged, means for securing the tubes in said securing means, means for heating the tubes, means for flanging the tubes, means for relatively rotating the tubes and said flanging means, and common means for operating said flanging means and said means for securing the tubes in said securing means.

34. In a machine for flanging glass tubes, means for securing a tube in position to be flanged, automatic means for flanging said tube, means for securing relative movement of the securing and flanging means about an axis perpendicular to the axis of the tube, and means for heating the tube.

35. In a machine for flanging glass tubes, means for securing a tube in position to be flanged, means for heating the tube, automatic means for flanging said tube, and means for securing relative rotation of the securing and flanging means about the axis of the tube and also relative movement about an axis perpendicular to the axis of the tube.

36. In a machine for flanging glass tubes, the combination of gripping means for securing a tube in position to be flanged, means for feeding tubes into said gripping means, means whereby said gripping means is caused to be in released position while a tube is being fed into it and in gripping position during the operation of flanging, flanging means and means for heating the tube.

37. In a machine for flanging tubes, the combination of a gripping means constantly tending to close for securing a tube in position to be flanged, means for feeding tubes into said gripping means, and means for holding said gripping means in released position while a tube is being fed into it.

38. In a machine for flanging glass tubes, the combination of a means for feeding tubes into position to be flanged, means for securing the tubes in said position, a common means for operating said feeding means and controlling the gripping of said securing means, means for flanging the tubes and means for heating the tubes.

39. In a machine for flanging glass tubes the combination of a means for feeding tubes into position to be flanged, means for flanging said tubes, a common means for operating said feeding and flanging means, and means for heating the tubes.

40. In a machine for flanging glass tubes, the combination of a means for securing tubes in position to be flanged, means for flanging said tubes, a common means for operating said flanging means and controlling the gripping of said securing means, and means for heating the tubes.

41. In a machine for flanging glass tubes, the combination of a flanging rod, means for heating the tubes, means for moving said flanging rod longitudinally toward the tube to be flanged, and means for causing motion of said rod about an axis perpendicular to that of said tube.

42. In a machine for flanging glass tubes, the combination with flanging means and means for heating the tubes of a device for removing the completed tube from the heat and permitting it to cool before it is discharged from the machine.

43. In a machine for flanging tubes, the combination of a movably supported discharge rod having a receiving end and means for elevating said receiving end to receive a completed tube and means for lowering said receiving end to discharge said tube.

44. In a machine for flanging glass tubes, the combination of means for feeding a tube into position to be flanged, means for heating the tube and means for flanging the tube.

45. In combination, a hopper, a selecting channel therein, a discharge in constant communication with the selecting channel, and mechanism whereby the vertical inclination of the bottom wall of the hopper about the selecting channel may be varied.

46. In combination, a hopper, a selecting channel therein, a discharge in constant communication with the selecting channel, and mechanism whereby the vertical inclination of the selecting channel may be varied.

47. In combination, a hopper, a selecting channel therein, a discharge connected with the selecting channel, and mechanism for varying the vertical inclination of the connection.

48. In combination, a hopper, a selecting channel therein, a discharge connected with the selecting channel, and mechanism for varying the vertical inclination of the selecting channel and the connection to the discharge.

49. In combination, a hopper, a selecting channel, a discharge connected with the selecting channel, and mechanism for varying the vertical inclination of the connection to the discharge and simultaneously maintaining the discharge outlet in one position.

50. In combination, a hopper journaled on an axis inclined to the vertical, a passageway from said hopper, a conducting chute in constant communication with said passageway, and means for rotating the hopper to change the vertical inclination of said passageway so that the material in the hopper will slide down said passageway by gravity.

51. The combination, with suitable support, of a hopper having a stem journaled in said support at an angle to the vertical, a tubular passageway leading from the base of the hopper through said stem whereby articles placed in the hopper may settle into the entrance to said pasageway in one position of the hopper and in another position will be raised to cause them to slide down said passageway.

52. The combination, with a suitable support, of a hopper having a stem journaled in said support on an axis at an angle with the vertical, a gear rotatably carried by said support and a flexible connection between the gear and the hopper whereby the hopper may be rotated.

In testimony whereof, I hereunto affix my signature in the presence of two witnesses.

JOHN T. FAGAN.

Witnesses:
JAMES M. SEE,
FREDERICK P. HARRIS.